July 3, 1923.  1,460,722
R. M. LOVEJOY
INTERNAL COMBUSTION ENGINE
Filed Nov. 14, 1916   2 Sheets-Sheet 1

Inventor.
Ralph M. Lovejoy
by Heard Smith & Tennant
Attys.

July 3, 1923.
R. M. LOVEJOY
1,460,722
INTERNAL COMBUSTION ENGINE
Filed Nov. 14, 1916    2 Sheets-Sheet 2
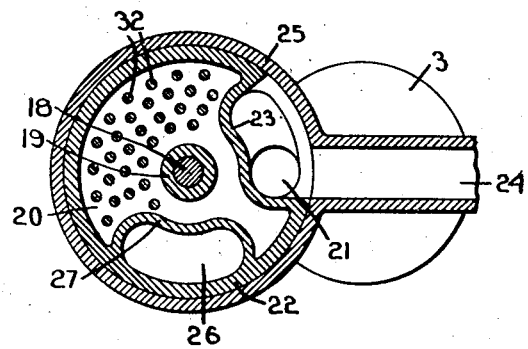
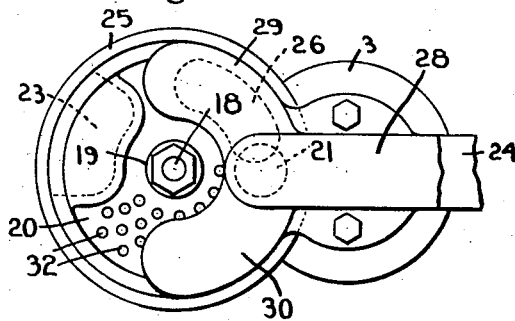
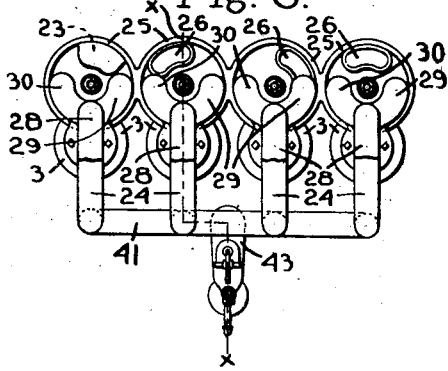
Inventor.
Ralph M. Lovejoy
by Heard Smith & Tennant
Attys.

Patented July 3, 1923.

1,460,722

UNITED STATES PATENT OFFICE.

RALPH M. LOVEJOY, OF MEREDITH, NEW HAMPSHIRE.

INTERNAL-COMBUSTION ENGINE.

Application filed November 14, 1916. Serial No. 131,335.

*To all whom it may concern:*

Be it known that I, RALPH M. LOVEJOY, a citizen of the United States, and resident of Meredith, county of Belknap, State of New Hampshire, have invented an Improvement in Internal-Combustion Engines, of which the following description, in connection with the accompanying drawing, is a specification, like characters on the drawing representing like parts.

This invention relates particularly to improvements in high speed internal combustion engines and the principal object thereof is to provide means for rapidly and completely vaporizing the liquid fuel and supplying the same to the engine and in so controlling the amount of gaseous fuel thus applied as to correlate the same to the demands of the engine.

A further feature of novelty comprises the utilization of a novel valve construction which is adapted to regulate and control the gaseous fuel introduced into the cylinders of combustion engines of high speed.

While the vaporizing means referred to herein is particularly adapted for use in internal combustion engines it will be understood that the vaporizing mechanism may be utilized in other types of apparatus in which it is desirable to volatilize or finely atomize a liquid irrespective of its character.

The efficiency of internal combustion engines is largely dependent upon the completeness of combustion of the charge and this is in turn dependent to a great extent upon the completeness of vaporization of the liquid fuel and its thorough mixture with a proper amount of air. The principal object of the invention is to provide means for completely vaporizing the fuel and mixing the same with the required amount of air by subjecting the liquid fuel to the action of a current of air of relatively small volume traveling at a high velocity the air thus employed being taken from and returned to the intake conduit leading to the cylinder so that the automatic control of the supply of air and fuel to the engine responding to its demands is not disturbed.

By this invention heavy hydrocarbons may be utilized as well as the lighter hydrocarbons now generally used without the preheating of the fuel or charge to high temperature usually employed to obtain a high degree of vaporization.

By vaporizing the fuel by a jet of air at high velocity, in accordance with my invention instead of preheating the charge a great advantage is obtained by reason of the fact that the cool charge of explosive mixture introduced into the cylinder is of greater density and contains more of hydrocarbon and oxygen than an equal volume of highly heated mixture, consequently the power developed by each explosion is greater and the efficiency of the engine increased.

Other objects and features of the invention will more fully appear from the following description and the accompanying drawing and will be particularly pointed out in the annexed claims.

The drawings illustrate, more or less diagrammatically, my invention applied to a reciprocating multi-cylinder engine of the usual type except as modified to incorporate my improvements therein.

In the drawings;

Fig. 3 is a detail horizontal sectional view through the rotary valve and its casing showing the valve establishing communication between the cylinder and intake, Fig. 4 is a detail plan view of the valve and its casing showing the same at the commencement of exhaust, and, Fig. 5 is a detail plan view of a multi-cylinder engine embodying my invention.

Figure 1:
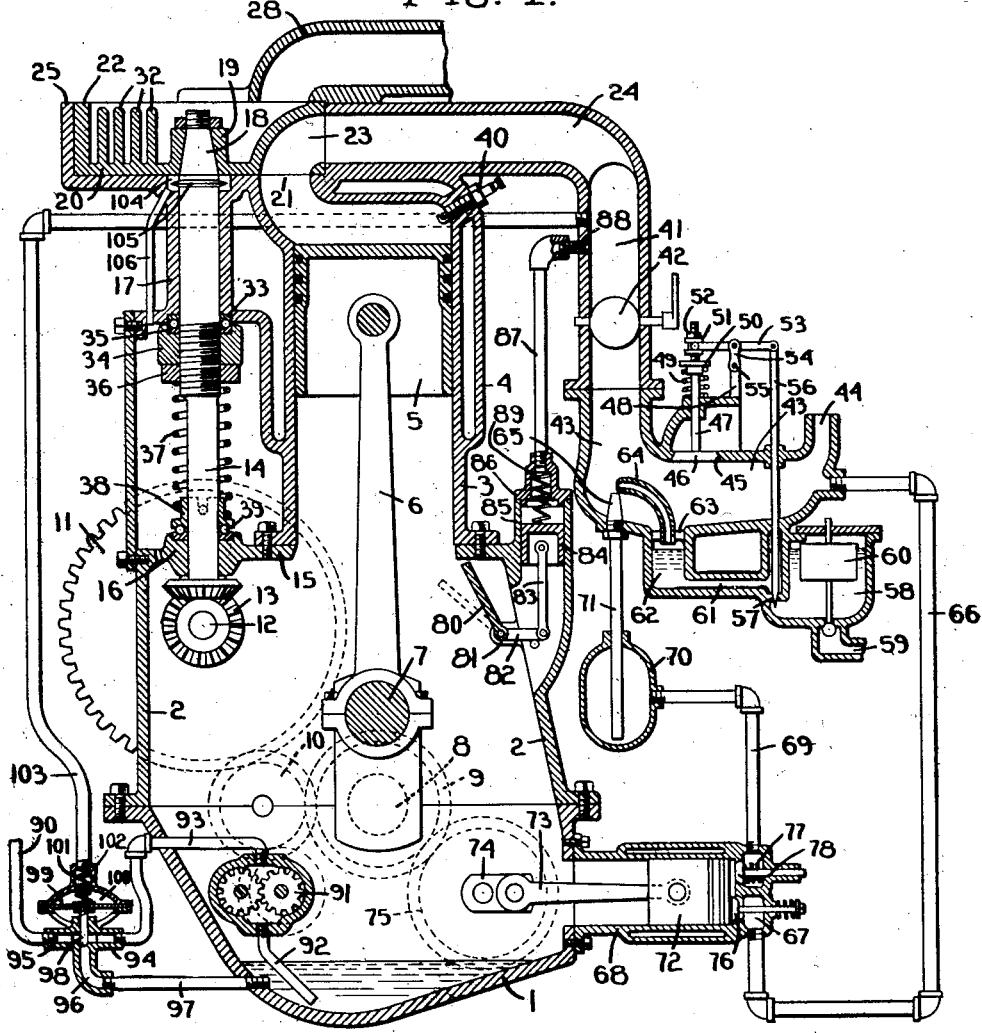
Fig. 1 is a vertical sectional view of an engine embodying my invention the various mechanisms being shown for convenience of illustration in the same vertical plane, the section being taken in the planes indicated by $x$—$x$ Fig. 5.
Figure 2:
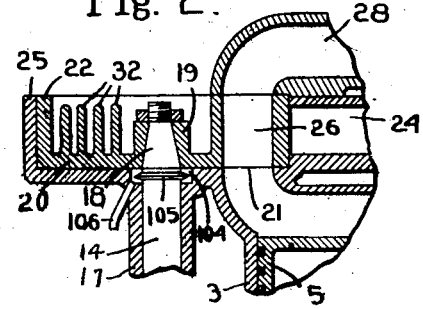
Fig. 2 is a detail sectional view of the rotary valve illustrating the same in exhausting position.

The illustrative embodiment of my invention shown in the drawings comprises a four cylinder engine each of which is equipped with a preferred form of rotary valve mechanism all of the cylinders being supplied with hydrocarbon mixture from the usual type of manifold.

The hydrocarbon supplied to said manifold is vaporized by a novel mechanism in which my invention is incorporated. The lubricating controlling means is shown as applied to one of the cylinders and its associated mechanisms but it will be understood that the principal of control thus illustrated is capable of use with each cylinder or with all jointly or with any lubricating system which it is desirable to regulate in conformity with the speed produced or work performed by the engine.

The engine shown in Fig. 1 of the drawing comprises the usual frame forming a two part crank case, the lower part 1 forming a receptacle for a pool of oil, the upper part 2 serving to support the cylinder 3 which is provided with the usual water jacket 4. The piston 5 is connected by the pitman 6 to the crank 7 on the usual crank shaft 8 which is journalled in suitable bearings in the frame (not shown) and serves to transmit the power of the engine in the usual manner. It will of course be understood that each of the several cylinders of the engine, as illustrated in Fig. 5 similarly supplies power to the common crank shaft.

The rotary valve for controlling the supply of explosive mixture to the cylinder and also the exhaust is actuated from the crank shaft 8 preferably through a train of gears 9, 10 and 11, the latter serving to rotate a shaft 12 which is journalled in suitable bearings in the casing and is provided with a miter gear 13 which meshes with a complementary miter gear fixedly secured upon the shaft or stem 14 of the rotary valve.

The valve shaft or stem 14 desirably is journalled in bearings disposed in parallelism with the axis of the piston but may be located otherwise to conform to the type of cylinder employed.

As shown herein the upper portion 2 of the crank case is provided with a horizontal flange or web 15 having a boss 16 forming the lower journal for the valve shaft 14 and the outer wall of the water jacket 4 of the cylinder is provided with an elongated boss 17 which forms the upper journal for said shaft.

The upper end of the shaft 14 preferably has a conoidal portion 18 which enters a corresponding conoidal recess in the hub 19 of the rotary valve 20. The rotary valve preferably is in the form of a disk, the under flat face of which covers the port 21 of the cylinder. In the preferred construction shown herein the charge is introduced and the products of combustion are discharged through this port. It is preferably, much larger than usual admission or exhaust ports to permit both charging and exhausting the cylinder quickly respectively through the charging and exhaust ports in the rotary valve.

The rotary valve 20 preferably has a vertical annular flange 22 which extends throughout the greater part of its circumference but merges into a curved web which rises from the base of the valve to its periphery and provides a lateral port 23 adapted to communicate with the intake manifold 24 which preferably extends across the cylinder head and may, if desired, be cast integral therewith to insure rigidity of construction.

The valve 20 is so designed that the port 23 presents an elongated recess adapted to establish communication between the intake 24 and the manifold during the intake stroke of the piston so that the cylinder will be fully charged. In order to prevent the escape of gaseous fuel from the recess forming the port 23 during the remainder of the rotation of the valve 20 an annular wall 25 is provided which fits closely the annular flange 22 and serves to retain the gases in the recess 23 after cut off.

The valve 21 also is provided with an exhaust aperture 26 which preferably is in the form of an elongated opening concentric with the axis of the valve. The exhaust aperture may serve to discharge the products of combustion directly to the atmosphere but preferably is enclosed by the flange 22 and a wall 27 so that the products of combustion will be directed into an exhaust pipe 25 which may conveniently be located adjacent to or above the inlet pipe 24.

The exhaust pipe 28 preferably is in the form of a casting bolted to the engine cylinder and is provided with extensions 29, 30 overlying the valve and adapted to prevent the escape of the burned gases by any other course than the exhaust pipe 28.

It will be observed that the greater part of the valve is exposed to the atmosphere so that it is air cooled. In order to increase the radiating surface a number of heat radiating projections, such as pins 32, or vanes, are cast upon or secured to the valve. These radiating members may be so formed if desired as to reinforce the portion of the valve which is subject to the shock of explosion.

In order to resist the force of the explosion and also to maintain freedom of movement at all times the valve 20 preferably is sustained by thrust bearings out of frictional contact with the annular surface beneath the base of the valve. It of course is to be understood that the valve fits very closely on its seat so that there will be no appreciable escape of gas through the valve seat. As illustrated herein the valve is supported upon anti-friction thrust bearings which comprise a bearing ring 33 seated in the lower end of the boss 17 and a collar 34, provided with a corresponding bearing ring 35 which is adjustably secured upon the shaft 14, suitable anti-friction devices such as balls being interposed between the bearing rings 34 and 35. The collar 34 preferably is screwed upon the shaft 14 and is locked in adjusted position by a lock nut 36. The members of the thrust bearing are held in close relation and the valve 20 is supported out of frictional engagement with the annular wall beneath the valve by a helical spring 37 which engages at its upper end the under face of the nut 36 and at its lower end is supported upon a collar 38 rotatable with the shaft and preferably carried by an antifriction bearing such as a ball bearing 39 resting upon the boss 16 in which the shaft 14 is journalled.

In the operation of the engine, the valve 20 is rotated from the crank shaft at the required speed,—which may be either constant or variable according to the gearing interposed between the crank shaft and the shaft of the valve,—to bring the admission port 23 in communication with the manifold just as the piston is about to begin its intake stroke, the port 23 extending peripherally around the valve a sufficient distance to cause cut off at the end of the intake stroke. The piston is then returned by the momentum of the usual fly wheel compressing the gaseous mixtures which are fired in the usual manner by a spark from a spark plug 40 located in the clearance space of the cylinder. At the time the explosion takes place the solid portion of the disk valve between the inlet and outlet ports covers the port 21 of the cylinder and the force of the explosion against the valve is taken up by the thrust bearing between the lower end of the boss 17 and the collar 34. The piston is then driven downward upon its working stroke. Upon the return exhaust stroke the valve 20 will have rotated sufficiently to bring the exhaust port in the valve into communication with the port 21 of the cylinder and the products of combustion will flow through these ports into the exhaust pipe 28 and thence to the air either directly or through a muffler.

In high speed engines the pistons reciprocate with great rapidity and consequently the rotary valves which revolve at half the speed of the engine crank have a rapid rotary movement. At the same time the vehicle which contains the engines is traveling at a high rate of speed so that in the present construction the radiation of heat from the valve will be rapid and will maintain the valve cool, particularly if it is provided with additional radiating surfaces such as those formed by the projections illustrated in the drawings or other usual forms of radiating surfaces. By the construction above described the defects heretofore resulting from the wearing away of the valves and breakage of springs are entirely eliminated. Furthermore the engine can be driven at any speed since the valve will co-operate properly with the intake and exhaust under any speed which can be attained by the reciprocating piston.

In order to obtain the greatest efficiency the cylinder must be supplied with an explosive mixture in which the hydro-carbon is thoroughly vaporized and mixed with the proper proportion of oxygen. This vaporization has heretofore been largely performed by carbureters of various types, in many of which heat has been added to the mixture to ensure more thorough vaporization than that obtained when the hydrocarbon is drawn or sprayed into the carbureter.

In other instances the liquid hydrocarbon is introduced directly into the engine cylinder and vaporized by the heat of the cylinder. In all cases in which the charge is highly heated either before entering the cylinder or during the suction stroke of the piston, the effectiveness of the charge is reduced by reason of the expansion of the gases forming the charge.

The present invention contemplates introducing into the cylinder a cool charge of thoroughly vaporized hydrocarbon mixed with the proper amounts of air so that a maximum amount of explosive mixture will be charged into the cylinder upon each intake stroke, and particularly in providing means for insuring perfect vaporization which will not interfere with the automatic regulation of the intake, which responds to the demand of the engine.

This is accomplished in the preferred embodiment of the invention illustrated herein by providing means for vaporizing the fuel under a jet of air flowing at a high velocity, air for the jet being taken from, and returned to, the manifold or other conduit which supplies the explosive mixture to the cylinder or cylinders.

As illustrated in the accompanying drawings the intake pipe 24 is connected to a manifold 41 which is provided with the usual butterfly throttle valve 42. This manifold is connected to or formed integral with a conduit 43 through which air is supplied to the engine. The conduit 43 has an opening 44 at its end adapted to permit the entry of sufficient air to supply the engine when idle and is also provided with a port 45 in which a valve 46 is seated which is adapted to respond to the requirements of the engine upon the intake strokes. The valve 46 has a stem 47 extending through a suitable bearing in a bracket 48 supported by or integral with a conduit and said valve is maintained normally seated by a helical spring 49 resting at one end upon said bracket and engaging at its other end a collar 50 secured upon the valve stem. The valve 46 is automatically operable for as the engine cylinder or cylinders create a vacuum in the manifold the pressure of the atmosphere upon the outer side of the valve will open the same against the action of the spring 49 until a sufficient amount of air is supplied through the port 45 to equalize the pressure within the manifold with that of the atmosphere.

In order to correlate the supply of liquid fuel to the demands of the engine the valve 46 is caused to operate a needle valve leading from the usual float tank to the vaporizing apparatus. In the construction illustrated herein the valve stem 47 is screw threaded at its upper portion and a collar 51 is screwed upon said stem and maintained in adjusted position by a lock nut 52. The collar 51 is provided with an annular groove which is engaged by a yoke upon the end of a lever 53 which is fulcrumed upon a link 54 pivotally mounted upon a stud 55 on the bracket 48. The opposite end of the lever 53 is connected to the stem 56 of the needle valve which controls the port 57 leading from a supplemental reservoir 58 to the vaporizing device.

In the preferred embodiment of the invention illustrated herein the supplemental reservoir 58 is a float chamber formed by a depending extension of the walls of the conduit 43. Fuel is supplied to the float chamber 58 through a pipe 59 connected with the usual main fuel tank, a valve in the pipe 59 leading from the main supply to the float chamber being controlled by the float 60. The fuel supplied to the chamber 58 passes through the port 57 and a duct 61 into a delivery chamber 62 from which it is vaporized. The chamber 62 is open at its top but is provided with transverse webs or ribs 63 which serve to support a pipe 64 terminating in a small orifice opposite end of a nozzle 65 through which compressed air is supplied. The pipe 64 extends into the chamber 62 but does not quite reach the normal level of the fluid in the chamber 62 when the engine is not running.

In the normal operation of the engine the vacuum created in the intake pipe will cause a difference of pressure on the liquid in the delivery chamber 62 and in the float chamber 58 so that the fluid in the delivery chamber 62 will be drawn up a sufficient distance to cover the lower end of the tube 64 and the jet of compressed air issuing from the nozzle 65 will draw the fuel through the pipe 64, by inspiration, and upon its emergence from the tube into the jet of air thoroughly atomize or vaporize the same.

I am aware that heretofore liquid fuel has been vaporized by jets of compressed air but the present invention contemplates such vaporization without destroying or modifying the conditions under which the supply of fuel and air responds automatically to the demands of the engine. In order to accomplish this the air used in vaporizing the fuel is taken from the conduit 43 and returned to it so that no air is either added to or substracted from that which enters the conduit through the usual admission port 44 and through the port 45 in response to the demands of the engine. In other words a small amount of air is shunted from said conduit, its pressure increased and delivered back to the conduit from which it came.

As illustrated herein, air is taken from the conduit 43 through a pipe 66 which leads to the inlet port 67 of a compressor 68 and is delivered from the compressor through a pipe 69 into a pressure chamber 70 from which a pipe 71 leads to the nozzle 65. Any suitable form of compressor may be used, for simplicity of illustration a single piston compressor is shown comprising a cylinder having a piston 72 reciprocably mounted therein and actuated by a pitman 73 driven from a crank 74 which is rotated by a suitable gear 75 actuated from the crank shaft of the engine. Upon its intake stroke the piston 72 draws air from the conduit 43 through the pipe 66 and port 67 into the cylinder. Upon its compression stroke the valve 76 in the port 67 is closed and the air forced through a port 77 into the pipe 69 and thence to the compression chamber 70. A valve 78 prevents air forced into the chamber 70 from returning to the cylinder, as is usual in compressors. The compression chamber 70 may be of such capacity as to maintain substantially a constant pressure at the nozzle 65. The compressor should be so constructed as to maintain a sufficiently high presure in the compression chamber 70 to insure complete vaporization of the fuel which passes through the supply pipe 64.

In the operation of the engine therefore the amount of air required by the engine is supplied mainly through the port 45 which is controlled by the valve 46 and the required amount of fuel is supplied in proportion to the air by the actuation of the needle valve 56 from the stem of the valve 46 so that there is a proper correlation of the amount of air and fuel supplied with the demands of the engine.

The operation of the vaporizing jet is wholly independent of these conditions and serves merely to insure complete volatilization or vaporization of the liquid fuel.

Another important feature of the invention consists in regulating the lubricating system of the engine and allied mechanisms in consonance with the work done by the engine. This is accomplished by providing means connected with the air intake for regulating either the baffle plates which control the splashing of the oil from the crank case upon the cylinder walls or in regulating the amount of oil delivered from the crank case or any other receptacle through a power-actuated lubricating system.

As illustrated herein the lower portion of the crank case 1 is so constructed as to form a reservoir adapted to contain a pool of oil into which the crank 7 dips upon each revolution. The oil is splashed from this pool up upon the cylinder walls 3. When the cylinder is running at full speed it is desirable that the oil shall be freely splashed upon the cylinder walls in order to maintain the same in a proper state of lubrication, but when the engine is run at a slower speed it is desirable that the amount of oil thus splashed up shall be limited.

In this engine, as in others, baffle plates are provided to prevent unnecessary splashing when the engine is running slow. As illustrated in the accompanying drawing the baffle plate 80 is pivoted in suitable bearings in brackets 81 extending into the casing. An arm 82 extending through the casing is connected to one end of a pitman 83 which is connected at its opposite end to a piston 84 mounted in a cylinder 85 carried by or forming part of the upper portion of the crank case. The head 86 of said cylinder is connected by a pipe 87 with the intake manifold 41, a restricting plug or pipe 88 preferably being interposed between the pipe 87 and the manifold 41 to reduce the action of the vacuum in the manifold upon the baffle plate regulating means. A helical spring 89 seated in a recess in the cylinder head 86 and bearing upon the end of the piston tends normally to force the piston downwardly and thereby to raise the baffle plate into full line position shown in Fig. 1.

When in the operation of the engine the throttle valve 42 is closed, a relatively high vacuum is maintained by the engine in the manifold 41. This exhausts the air from the pipe 87, thus reducing the pressure in the cylinder 85 and causing the piston 84 to rise under the pressure of the atmosphere from without so that the baffle plate 80 is carried more or less toward the position illustrated in dotted lines in Fig. 1.

When the throttle 42 is opened the air pressure in the conduit 41 decreases so that the air pressure within the cylinder 85 comes more nearly to atmospheric pressure. Under such circumstances the spring 89 forces the piston downward and raises the baffle plate 80, thus enabling a greater amount of oil to be supplied to the cylinder.

The same principle may also be used conveniently to control a lubricating system. In the illustrated embodiment of the invention disclosed herein the lubricating system, not illustrated in detail, is supplied through a pipe 90 from a rotary pump 91 which receives its supply through a pipe 92 leading into the pool of oil in the bottom of the crank case. The pump 91 delivers the oil through the pipe 93 to a conduit 94 having two delivery openings, one of which, 95, leads to the pipe 90 and the other of which, 96, leads through a return pipe 97 to the reservoir in the crank case. The port leading to the return pipe 97 or by-pass is controlled by a valve 98 operated by a diaphragm 99 which extends across and forms a wall of a chamber 100. The valve 98 is normally maintained in closed position by a helical spring 101 carried in an extension 102 of the casing of the diaphragm valve and pressing at its lower end upon a disk seated upon said diaphragm. A pipe 103 leads from the chamber 102 to the manifold 41. When the throttle 42 is closed and the engine running slowly the increased amount of vacuum or rather the decreased pressure, in the manifold reduces the pressure in the chamber 100 and permits atmospheric pressure to raise the valve 98 from its seat thereby opening the valve 98 in the return pipe or by-pass to the pool of lubricant in the bottom of the crank case so that there is a local circulation. When, however, the throttle of the engine is opened the pressure in the manifold and in the chamber 100 is increased, the spring 101 closes the valve 98 so that the pump forces the oil directly through the pipe 90 to the various mechanisms which are supplied with lubrication from this forced lubrication system.

The journal of the valve shaft 14 may be lubricated in any suitable manner, preferably from the circulating system.

In order to prevent any excess of oil from working into the bearing between the lower face of the disk valve 20 and the wall of the port or valve seat an annular recess 104 is provided in the valve seat around the valve shaft 14 and a bevelled ring 105 is secured to the shaft within said recess. The rapid rotation of the shaft with its ring causes any oil which works up through the journal to be thrown out centrifugally within said recess from which it is delivered by a pipe 106 which preferably carries the oil back into the casing whence it returns to the body of lubricant in the bottom of the crank case.

It is to be understood that the mechanisms illustrated herein are illustrative of a preferred embodiment of my invention but are not in any way restrictive and that the invention may be embodied in various other forms within the meaning and scope of the following claims which are intended broadly to cover any physical means capable of incorporating the broad principals of the invention herein set forth.

Having thus described my invention what I claim as new and desire to secure by Letters Patent is:

1. In combination with an internal combustion engine having a combustion chamber, an intake conduit leading to said combustion chamber and having an air intake port; means for supplying liquid fuel to said conduit and means for vaporizing said liquid fuel by air taken from said conduit and caused to impinge at high velocity upon the liquid fuel within said conduit.

2. In combination with an internal combustion engine having a combustion chamber, an intake conduit leading to said combustion chamber and having an air intake port; a compressor having means for taking air from said conduit, increasing the pressure thereof and returning the same again to said conduit in the form of a jet of high velocity and means for delivering the liquid fluid to said jet.

3. In combination with an internal combustion engine comprising a combustion chamber, an intake conduit leading to said combustion chamber and having an air intake port, a valve in said port automatically responsive to the demands of the engine and means for supplying fuel to said conduit; means for taking air from said conduit, increasing its pressure and causing the same to impinge upon the fuel within said conduit whereby vaporization of the fuel will be increased without substantially modifying the automatic action of said valve.

4. In combination with an internal combustion engine comprising a combustion chamber, an intake conduit leading to said combustion chamber and having an air intake port, a valve in said port automatically responsive to the demands of the engine and means for supplying fuel to said conduit; means operable by said valve for automatically regulating the fuel supply, means for taking air from said conduit, increasing its velocity and causing the same to impinge upon the fuel within said conduit whereby vaporization of the fuel will be increased without substantially modifying the automatic action of said valve.

5. In combination with an internal combustion engine comprising a combustion chamber, an intake conduit leading to said combustion chamber, having an air intake port and a valve in said port automatically responsive to the demands of the engine; a fuel supply, a delivery chamber communicating therewith and opening into said conduit, means automatically operable by said valve to regulate the supply of fuel to said delivery chamber, means for taking air from said conduit, increasing its pressure and returning it into said conduit in the form of a jet of high velocity and means for delivering fuel from said delivery receptacle into the path of said jet.

6. In combination with an internal combustion engine comprising a combustion chamber, an intake conduit leading to said combustion chamber, having an air intake port and a valve in said port automatically responsive to the demands of the engine; a liquid fuel supply comprising a float chamber, a delivery chamber communicating therewith and opening into said conduit, means automatically operable by said valve to regulate the supply of fuel from said float chamber to said delivery chamber, means for taking air from said conduit, increasing its pressure and returning it into said conduit in the form of a jet of high velocity, means for delivering fuel from said delivery receptacle into the path of said jet comprising a tube having its lower end slightly above the normal level of the fluid in said delivery receptacle and its upper end adjacent the path of said jet whereby the level of the fluid in the delivery receptacle will be caused to rise and cover the lower end of the tube by the suction of the conduit and fuel will be delivered to said jet through inspiration of the jet and the fluid highly vaporized by said jet.

7. In combination with an internal combustion engine comprising a cylinder and piston, and a crank shaft operable by the reciprocation of said piston, an intake conduit leading to said cylinder and having an air intake port and a valve in said port automatically responsive to the demands of the engine; and means for supplying liquid fuel to said conduit, a compressor operable from said crank shaft having means for taking air from said conduit and returning the same to said conduit in the form of a jet of high velocity and means for delivering the liquid fuel into the path of said jet.

8. In combination with an internal combustion engine having a combustion chamber and an intake conduit leading thereto, liquid supplying means, liquid delivering means, communicating with said supplying means, operable by the suction of the engine to draw liquid from said liquid supplying means in response to the demands of the engine and means for taking gaseous fluid from said intake conduit, increasing its pressure and causing it to impinge upon and vaporize the liquid of said liquid delivering means.

9. In combination with an internal combustion engine having a combustion chamber and an intake conduit leading thereto, liquid supplying means, liquid delivering means, communicating with said liquid supplying means, operable by the suction of the engine to draw liquid from said liquid supplying means in response to the demands of the engine, means for regulating the liquid supplied to said delivering means from said supplying means, means for taking gaseous fluid from said intake conduit, increasing its pressure and causing it to impinge upon and vaporize the liquid of said liquid delivery chamber and means for preventing the action of the gaseous fluid under pressure from affecting the regulated amount of liquid supplied to said liquid delivery device.

10. In combination with an internal combustion engine having a combustion chamber and an intake conduit leading thereto, liquid supplying means, liquid delivering means communicating with said supplying means and having a delivery pipe communicating with said intake conduit, means for regulating the liquid supplied to said liquid delivering means, means for drawing gaseous fluid from said intake conduit, increasing the pressure thereof and producing a jet of gaseous fluid under pressure in co-operative relation to said delivery pipe operable to produce a jet of liquid therefrom by aspiration and vaporize the liquid of said jet and means for preventing the aspiration of the liquid produced by said gaseous fluid under pressure from increasing the regulated amount of liquid supplied to said delivering means.

11. In combination with an internal combustion engine having a combustion chamber and an intake conduit leading thereto, liquid supplying means, an open liquid delivery chamber communicating with said intake and with said liquid supplying means, whereby the suction of the engine will draw liquid from said supplying means into said delivery chamber in response to the demands of the engine, means for producing a flow to gaseous fluid under pressure greater than atmospheric pressure in said conduit and causing the same to produce by aspiration a jet of liquid from said delivery chamber and vaporize the same only when the liquid in said delivery chamber is at or above a predetermined level in said delivery chamber and means for regulating the amount of liquid supplied to said delivery chamber.

12. In combination with an internal combustion engine comprising a combustion chamber, an intake conduit leading to said combustion chamber, having an air intake port and a valve in said port automatically responsive to the demands of the engine; a liquid fuel supply comprising a float chamber, a delivery chamber communicating therewith and opening into said conduit, means automatically operable by said valve to regulate the supply of fuel from said float chamber to said delivery chamber, means for producing a jet of gaseous fluid under pressure, means for delivering fuel from said delivery chamber into the path of said jet comprising a tube having its lower end slightly above the normal level of the liquid in said float chamber and its upper end adjacent the path of said jet whereby the level of the liquid in the delivery chamber will be caused to rise and cover the lower end of the tube by the suction of the conduit and fuel will be delivered to said jet through aspiration of the jet and the liquid highly vaporized by said jet.

13. Liquid vaporizing means for internal combustion engines comprising a liquid supplying reservoir, a liquid delivery chamber exposed to the suction of the engine, means for supplying liquid thereto from said reservoir, means operable to produce and vaporize a jet of liquid from said delivery chamber only when the liquid therein is at a predetermined level higher than the level of the liquid in said reservoir and means for regulating the flow of liquid from said reservoir to said delivery chamber.

14. Liquid vaporizing means for internal combustion engines comprising a liquid supplying reservoir, a liquid delivery chamber exposed to the suction of the engine, means for supplying liquid thereto from said reservoir, means for regulating the liquid supplied from said reservoir to said delivery chamber, means for producing a jet of gaseous fluid under pressure, means operable by said jet of gaseous fluid to vaporize the liquid from said delivery chamber and means for preventing the aspiration of the liquid produced by the gaseous fluid under pressure from increasing the regulated amount supplied to the liquid delivery chamber.

15. Liquid vaporizing means for internal combustion engines comprising a reservoir for a liquid fuel, an open liquid delivery chamber communicating with the intake of the engine and subject to the suction of the engine, a conduit leading from said reservoir to said liquid delivery chamber, whereby the liquid will be drawn from the reservoir into said liquid delivery chamber by the suction of the engine, a delivery pipe having its end extending into said delivery chamber and terminating at a distance from the bottom thereof, means for producing a jet of gaseous fluid under pressure and causing the same to produce an aspirating effect upon said pipe and to vaporize the liquid drawn from said delivery chamber through said pipe by aspiration and means for regulating the flow of liquid from said reservoir to said delivery chamber whereby the level of the liquid in said delivery chamber may be controlled with respect to the end of said delivery pipe and the amount of liquid vaporized thereby regulated.

In testimony whereof, I have signed my name to this specification.

RALPH M. LOVEJOY.